US010830635B2

(12) United States Patent
Kawaguchi et al.

(10) Patent No.: US 10,830,635 B2
(45) Date of Patent: Nov. 10, 2020

(54) CALIBRATION DATA TRANSMISSION METHOD, AND BALANCE AND RADIO COMMUNICATION SYSTEM FOR THE METHOD

(71) Applicant: A&D COMPANY, LIMITED, Tokyo (JP)

(72) Inventors: Haruna Kawaguchi, Saitama (JP); Yoshikazu Nagane, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 6 days.

(21) Appl. No.: 16/087,271

(22) PCT Filed: Sep. 14, 2017

(86) PCT No.: PCT/JP2017/033259
§ 371 (c)(1),
(2) Date: Sep. 21, 2018

(87) PCT Pub. No.: WO2019/053838
PCT Pub. Date: Mar. 21, 2019

(65) Prior Publication Data
US 2019/0360857 A1 Nov. 28, 2019

(51) Int. Cl.
*G01G 23/01* (2006.01)
*G01G 23/37* (2006.01)
(Continued)

(52) U.S. Cl.
CPC .......... *G01G 23/01* (2013.01); *G01G 23/3728* (2013.01); *G01G 23/42* (2013.01); *G08C 17/02* (2013.01)

(58) Field of Classification Search
CPC .... G01G 23/01; G01G 23/42; G01G 23/3728; G08C 17/02
See application file for complete search history.

(56) References Cited

U.S. PATENT DOCUMENTS

2008/0219368 A1* 9/2008 Watanabe ............ H04B 7/0434
375/260
2012/0010840 A1   1/2012 Fankhauser et al.
(Continued)

FOREIGN PATENT DOCUMENTS

JP   10-073475 A   3/1998
JP   2001013001 A   1/2001
(Continued)

OTHER PUBLICATIONS

Written Opinion of International Searching Authority issued in corresponding International Application No. PCT/JP2017/033259 dated Nov. 14, 2017.

*Primary Examiner* — Alexander Satanovsky
*Assistant Examiner* — Mark I Crohn
(74) *Attorney, Agent, or Firm* — Roberts Calderon Safran & Cole P.C.

(57) ABSTRACT

To reliably exercise radio communication of calibration data. In order to achieve the above-described object, a balance (10) includes a weight sensor (12), a built-in weight (20) to be loaded on the weight sensor, an adding and removing unit (21) for the built-in weight, an arithmetic processing unit (14) configured to drive the adding and removing unit, and a radio communication device (41) connected to the arithmetic processing unit, wherein the arithmetic processing unit includes a radio wave environment check section (32) configured to check a radio wave environment, and a calibration execution section (33) configured to add or remove the built-in weight and issue a command to the radio communication device to transfer calibration data when the radio wave environment check section determines that the radio wave is good.

6 Claims, 7 Drawing Sheets

(51) Int. Cl.
*G01G 23/42* (2006.01)
*G08C 17/02* (2006.01)

(56) References Cited

U.S. PATENT DOCUMENTS

2017/0003161 A1   1/2017  Moser
2017/0234722 A1*  8/2017  Mount .................. G01G 23/01
                                                    702/101
2018/0195893 A1*  7/2018  Chvaicer ................ G01G 23/01

FOREIGN PATENT DOCUMENTS

| JP | 2011137753 A | 7/2011 |
| JP | 2012517010 A | 7/2012 |
| WO | 2017/145430 A1 | 8/2017 |

* cited by examiner

CALIBRATION DATA TRANSMISSION METHOD, AND BALANCE AND RADIO COMMUNICATION SYSTEM FOR THE METHOD

TECHNICAL FIELD

The present invention relates to a balance that communicates calibration data by radio.

BACKGROUND ART

Among balances, specifically, electronic balances with high weighing accuracy, to maintain the weighing accuracy, there is a type having a built-in weight for calibration inside the balance. In a balance with a built-in weight, when a calibration key is pressed down, when a certain amount of temperature change occurs, or when a certain period of time elapses, a built-in weight is loaded on or unloaded from a weight sensor of the balance and measurement values are recorded to perform calibration (for example, Patent Literature 1). A plurality of measurement values obtained through calibration (hereinafter, referred to as calibration data) are sequentially transferred from the balance to an external device by a radio transmitter of, for example, the Bluetooth (registered trademark) standard.

CITATION LIST

Patent Literature

[Patent Literature 1] Japanese Published Unexamined Patent Application No. 2001-013001

SUMMARY OF THE INVENTION

Technical Problem

However, if calibration is performed in a bad radio wave environment in which the distance between the balance and the external device leaves no margin with regard to a radio communication enabling distance, there is an obstacle between the balance and the external device, a radio wave interferes with a radio wave emitted from another device, or the time period is crowded with radio waves, calibration data is not correctly transferred, and missing data may occur. In particular, when strict maintenance and management and record storage are required for a balance to be used according to standard relating to pharmaceuticals such as GLP (Good Laboratory Practice), missing calibration data may lead to a lack of calibration records.

An object of the present invention is to solve the above-described problem, and provide a calibration data transmission method capable of reliably transferring (radio-communicating) calibration data, and a balance and a radio communication system for the method.

Solution to Problem

In order to solve the above-described problem, a balance according to an aspect of the present invention includes a weight sensor, a built-in weight to be loaded on the weight sensor, an adding and removing unit for the built-in weight, an arithmetic processing unit configured to drive the adding and removing unit, and a radio communication device connected to the arithmetic processing unit, wherein the arithmetic processing unit includes a radio wave environment check section configured to check a radio wave environment, and a calibration execution section configured to add or remove the built-in weight and issue a command to the radio communication device to transfer calibration data when the radio wave environment check section determines that the radio wave is good.

Also, in order to solve the above-described problem, a radio communication system according to an aspect of the present invention includes a balance including a weight sensor, a built-in weight to be loaded on the weight sensor, an adding and removing unit for the built-in weight, and an arithmetic processing unit configured to drive the adding and removing unit, a first radio communication device connected to the arithmetic processing unit, and a second radio communication device configured to receive data from the first radio communication device and installed in or connected to an external device, wherein the arithmetic processing unit includes a radio wave environment check section configured to check a radio wave environment, and a calibration execution section configured to add or remove the built-in weight and issue a command to the radio communication device to transfer calibration data when the radio wave environment check section determines that the radio wave environment is good.

Also, in order to solve the above-described problem, a calibration data transmission method according to an aspect of the present invention uses a radio communication system including a balance, a first radio communication device of a data transmission side connected to the balance, and a second radio communication device of a data reception side connected to an external device, and includes a step (a) of checking a radio wave environment around the balance, a step (b) of calibrating the balance when the radio wave environment is good in the step (a), and subsequent to the step (b), a step (c) of transferring calibration data from the first radio communication device to the second radio communication device.

In the method according to the aspect described above, it is also preferable that a determination as to whether a radio wave environment is good in the step (b) is made based on a response rate of a positive acknowledgement from the second radio communication device in response to a command signal output from the balance via the first radio communication device.

In the balance according to the aspect described above, it is also preferable that the arithmetic processing unit further includes a radio wave environment map creation section configured to create a radio wave environment map by time by periodically checking the radio wave environment, and the calibration execution section is configured to add or remove the built-in weight and issue a command to the radio communication device to transfer calibration data when a radio wave environment at a calibration time is good with reference to the radio wave environment map.

In the radio communication system according to the aspect described above, it is also preferable that the arithmetic processing unit further includes a radio wave environment map creation section configured to create a radio wave environment map by time by periodically checking the radio wave environment, and the calibration execution section is configured to add or remove the built-in weight and issue a command to the radio communication device to transfer calibration data when a radio wave environment at a calibration time is good with reference to the radio wave environment map.

Effect of the Invention

According to the present invention, radio communication of calibration data can be reliably executed.

DESCRIPTION OF EMBODIMENTS

Next, preferred embodiments of the present invention are described with reference to the drawings.

First Embodiment

Figure 1:
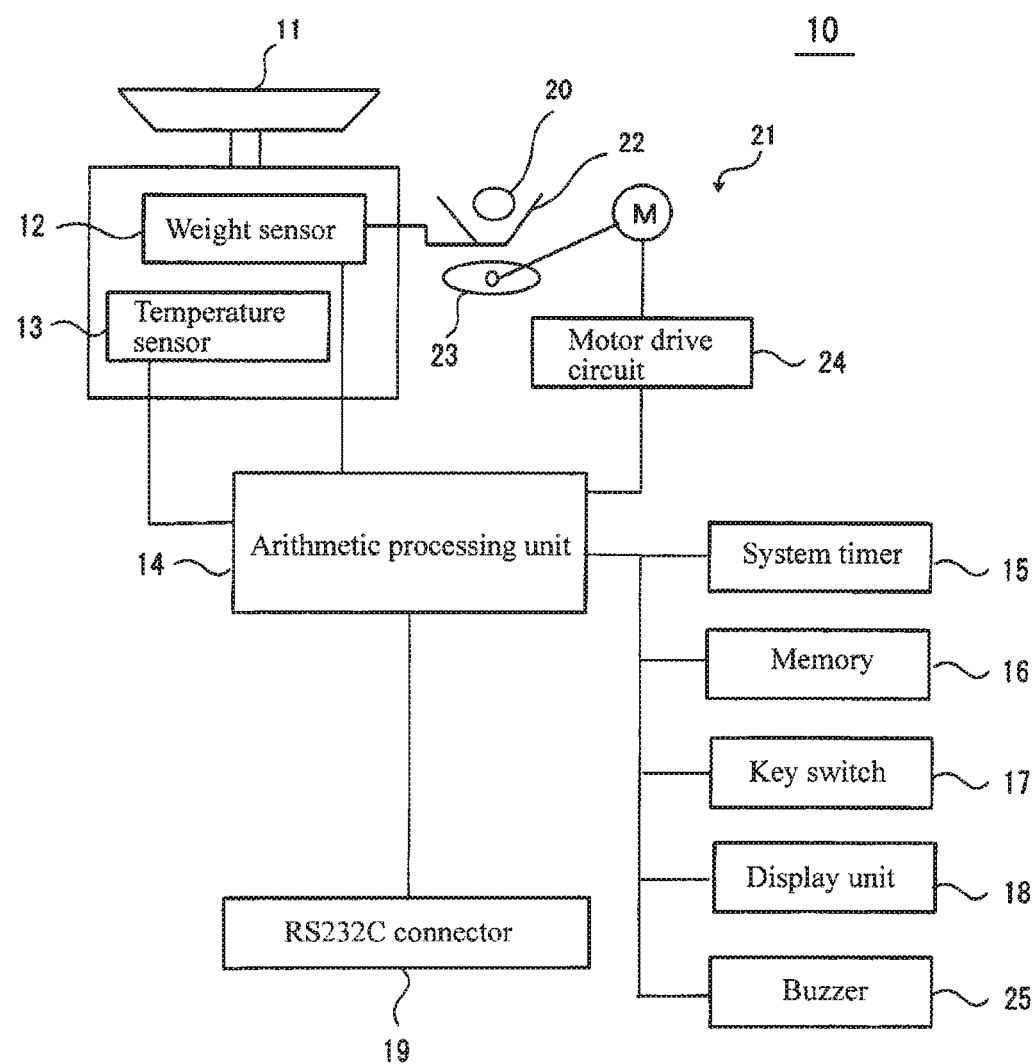
FIG. 1 is a configuration block diagram of a balance according to a first embodiment.

A balance 10 in FIG. 1 is an electronic balance. The balance 10 includes a weighing pan 11, a weight sensor 12, a temperature sensor 13, an arithmetic processing unit 14, a system timer 15, a memory 16, a key switch 17, a display unit 18, an RS232C connector 19, a built-in weight 20, an adding and removing unit 21, and a buzzer 25.

As the weight sensor 12, an electromagnetic balance type, a strain gauge type, a capacitance type, etc., may be used. To the weight sensor 12, a load of a measuring object placed on the weighing pan 11 is transmitted via a beam (not illustrated). A load detected by the weight sensor 12 is analog-output as measurement data, and A/D converted and output to the arithmetic processing unit 14.

The built-in weight 20 is loaded and unloaded by the adding and removing unit 21. The adding and removing unit 21 includes a built-in weight receiving portion 22, a cam 23, a motor M, and a motor drive circuit 24. The built-in weight receiving portion 22 is linked to a beam connected to the weight sensor 12, and a load of the built-in weight 20 loaded on the built-in weight receiving portion 22 is transmitted to the weight sensor 12. The motor drive circuit 24 is connected to the arithmetic processing unit 14, and the adding and removing unit 21 drives the motor M in response to a command from the arithmetic processing unit 14 and raises or lowers the built-in weight receiving portion 22 by turning the cam 23, and loads or unloads the built-in weight 20 on and from the built-in weight receiving portion 22. For the adding and removing unit 21, a pump type may be adopted as a drive unit.

The temperature sensor 13 detects a temperature in an environment in which the balance 10 is disposed. Temperature data output from the temperature sensor 13 is A/D converted and output to the arithmetic processing unit 14. As necessary, a humidity sensor and an atmospheric pressure sensor may be added.

The system timer 15 acquires a current time (system time) of the balance 10 by calculating count values of a hardware timer and a software timer.

The key switch 17 and the display unit 18 are connected to the arithmetic processing unit 14, and are provided on a front side surface of a main body case of the balance 10. The RS232C connector 19 is provided on, for example, left and right side surfaces or a rear side surface of the main body case of the balance 10, and connected to the arithmetic processing unit 14.

The arithmetic processing unit 14 is, for example, a microcontroller including a CPU, a ROM, and a RAM, etc., mounted on an integrated circuit, and the memory 16 is a storage medium such as a hard disk. The arithmetic processing unit 14 calculates measurement data detected by the weight sensor 12 as a measurement value, records the measurement value in the memory 16 and displays the measurement value on the display unit 18. In the memory 16, various programs for calculations of the arithmetic processing unit 14 are stored, and a threshold R for determination on a radio wave environment described below is stored.

Figure 2:
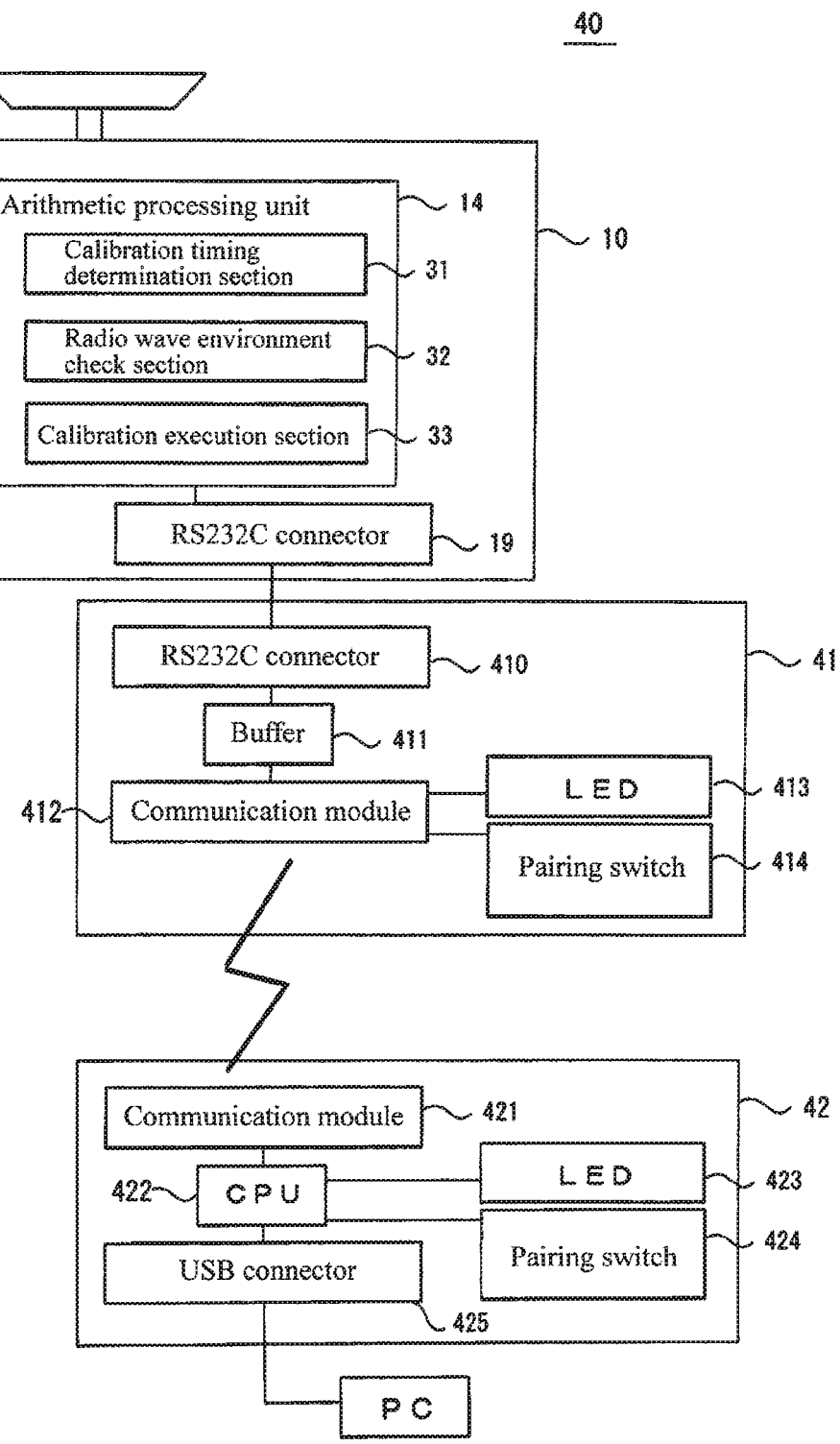
FIG. 2 is a block diagram of a radio communication system according to the first embodiment.

FIG. 2 is a block diagram of a radio communication system 40. The radio communication system 40 includes the balance 10. To the balance 10, the first radio communication device 41 is connected. The second radio communication device 42 is connected to a general-purpose personal computer PC. That is, the first radio communication device 41 is connected to the balance 10 of a data transmission side, and the second radio communication device 42 is connected to the external device of a data reception side.

The first radio communication device 41 includes an RS232C connector 410, a buffer 411 for voltage level conversion, a communication module 412, an LED 413, and a pairing switch 414.

The first radio communication device 41 and the balance 10 are connected by the RS232C connectors 410 and 19 via an RS232C cable or directly. The communication module 412 is, for example, a module with a wireless standard such as Bluetooth (registered trademark), Zigbee (registered trademark), etc., or a wireless LAN (Local Area Network) such as Wi-Fi. The communication module 412 transmits data to the second radio communication device 42 by being triggered by a command issued from the balance 10. To the communication module 12, the LED 413 and the pairing switch 414 are connected. The LED (light emitting diode) 413 is electrically continuous to the communication module 412, and emits light during operation of the communication module 412. By the light emission of the LED 413, a user can visually confirm that communication is being executed.

The second radio communication device 42 includes a communication module 421, a CPU 422, an LED 423, a paring switch 424, and a USB connector 425.

The second radio communication device 42 is connected to the personal computer PC via the USB connector 425. As the communication module 421, a module with the same standard as the first radio communication device 41 is adopted. The CPU 422 communicates with the personal computer PC. To the CPU 422, the LED 423 and the paring switch 424 are connected. The LED 423 emits light during operation of the CPU 422. By the light emission of the LED 423, a user can visually confirm that communication is being executed.

Here, as illustrated in FIG. 2, the arithmetic processing unit 14 of the balance 10 of the present embodiment includes a calibration timing determination section 31, a radio wave environment check section 32, and a calibration execution section 33.

The calibration timing determination section 31 periodically acquires temperature data from the temperature sensor 13, and automatically determines it as a calibration timing when the temperature exceeds a predetermined reference value. In addition, the calibration timing determination section acquires a system time from the system timer 15, and automatically determines it as a calibration timing when a predetermined calibration period has elapsed. In addition, the calibration timing determination section determines it as a calibration timing when a calibration key included in the key switch 17 is pressed down. Operation of the calibration timing determination section 31 is the same as in the conventional technology.

The radio wave environment check section 32 checks a current radio wave environment of the balance 10 ("radio wave environment check"). The radio wave environment check section 32 operates when it is determined as a calibration timing by the calibration timing determination section 31.

Figure 3:
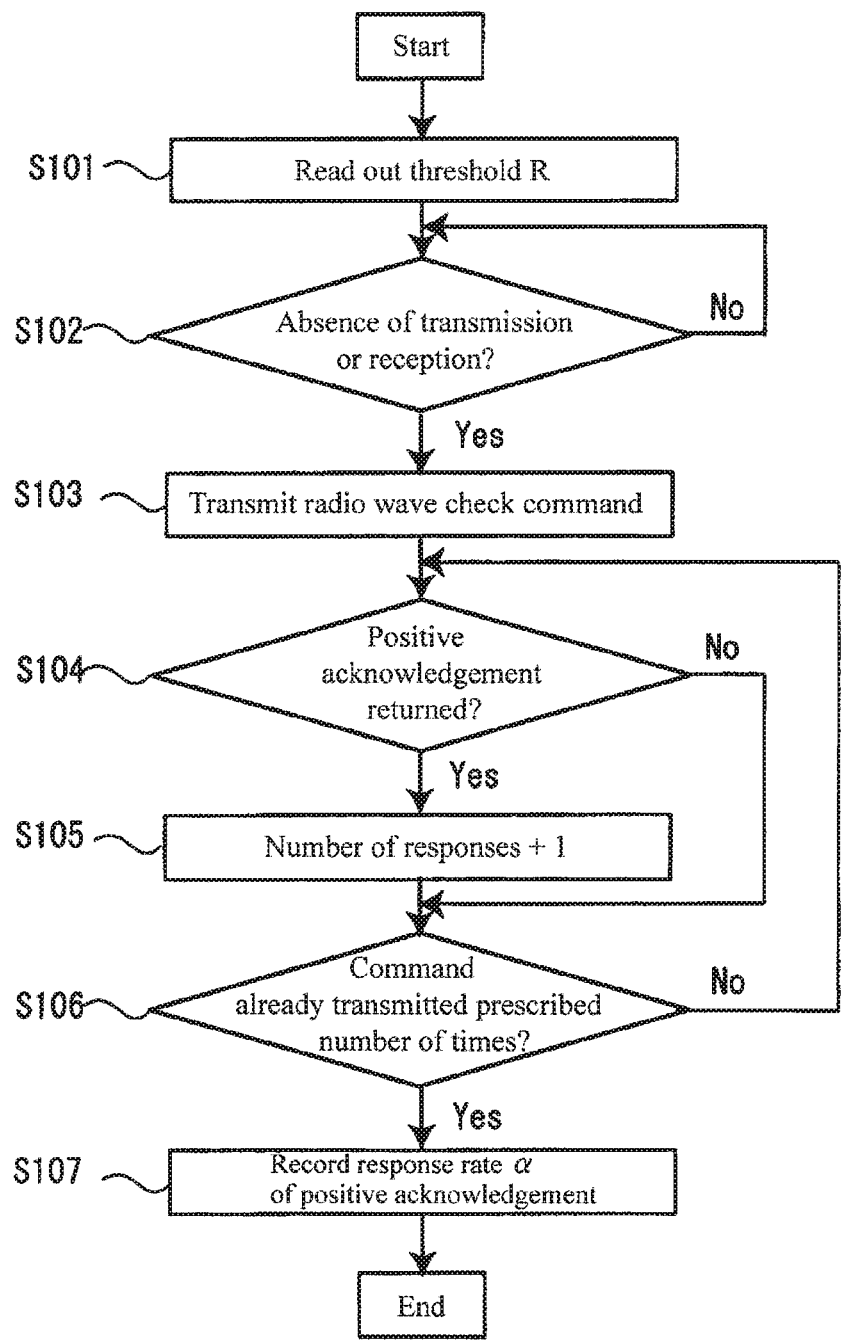
FIG. 3 is an operation flowchart of a radio wave environment check according to the first embodiment.

FIG. 3 is an operation flowchart of a radio wave environment check to be performed by the radio wave environment check section 32.

The radio wave environment check section 32 reads out a threshold R for determination on a radio wave environment from the memory 16 in Step S101. The threshold R is described below.

Next, the process shifts to Step S102, and the radio wave environment check section 32 checks if there is data transmission or reception between the first radio communication device 41 and the second radio communication device 42. When there is no data transmission or reception (Yes), the process shifts to Step S103. When there is data transmission or reception (No), the process returns to Step S102.

Next, the process shifts to Step S103, and the radio wave environment check section 32 generates a radio wave check command. The first radio communication device 41 that has received the radio wave check command transmits a command signal to the second radio communication device 42.

Next, the process shifts to Step S104, and the radio wave environment check section 32 checks if a positive acknowledgement is returned from the second radio communication device 42. When a positive acknowledgement is returned (Yes), the process shifts to Step S105, and the number of responses is incremented by 1 (plus 1). When a positive acknowledgement is not returned (No), the process shifts to Step S106.

When the process shifts to Step S106, the radio wave environment check section 32 checks if the command signal has been transmitted a prescribed number of times. When the number of times of transmission is less than the prescribed number of times (No), the process returns to Step S104. When the number of times is equal to or more than the prescribed number of times (Yes), the process shifts to Step S107.

When the process shifts to Step S107, the radio wave environment check section 32 calculates a "response rate α" of a positive acknowledgement from the number of responses. For example, when a command signal is transmitted 50 times per second and the number of responses is 42, the response rate α is 84%. The radio wave environment check section 32 records the "response rate α" in the memory 16, and ends the operation.

Figure 4:
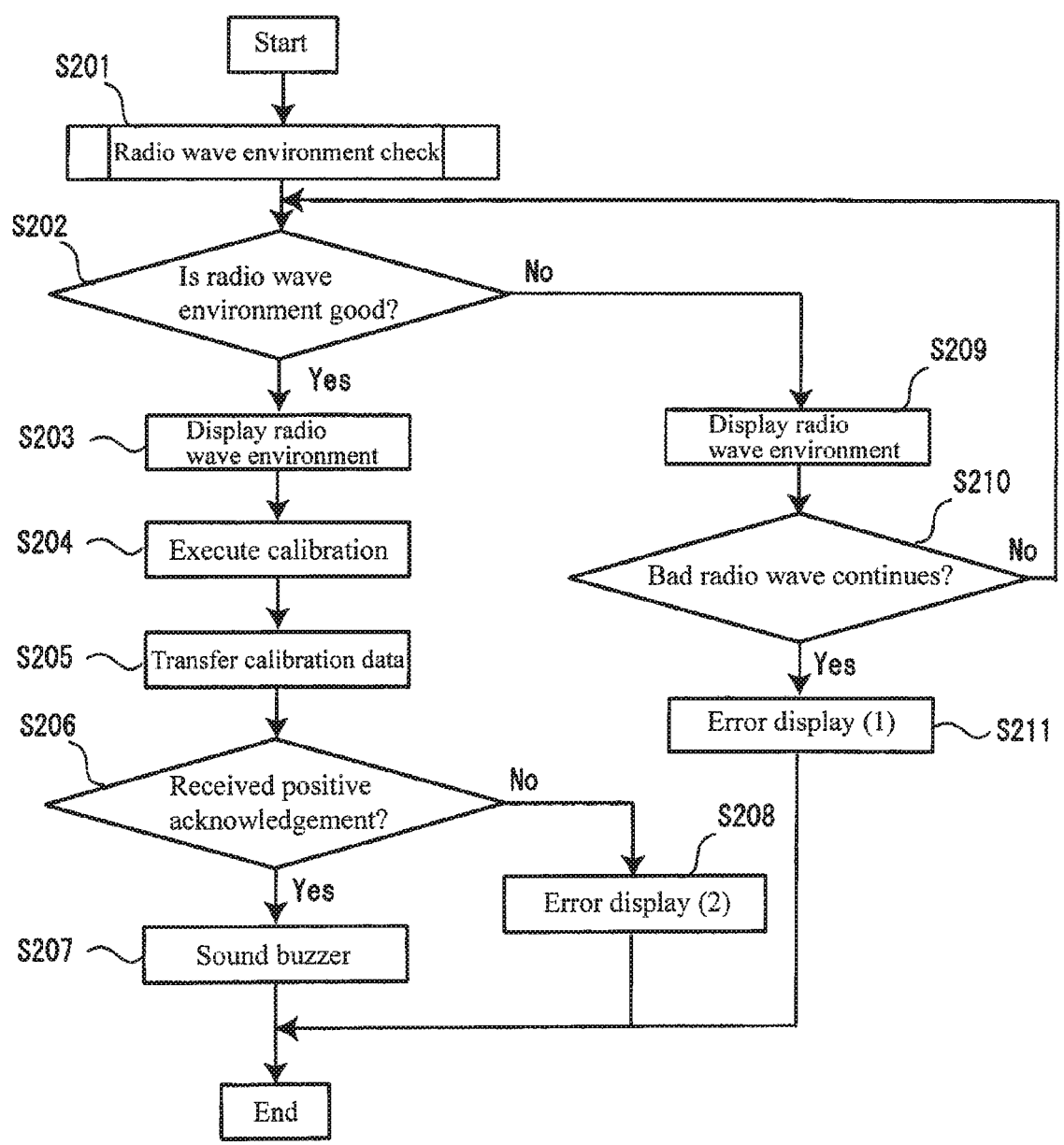
FIG. 4 is an operation flowchart of calibration according to the first embodiment.

FIG. 4 is an operation flowchart of calibration according to the first embodiment.

The calibration execution section 33 executes calibration based on detection results of the radio wave environment check section 32. The calibration execution section 33 operates subsequent to the operation of the radio wave environment check section 32. Therefore, first, in Step S201, the "radio wave environment check" illustrated in FIG. 3 is performed.

Next, the process shifts to Step S202, and the calibration execution section 33 reads out the response rate α obtained in Step S201 and the threshold R, and compares the response rate α and the threshold R to determine whether the radio wave environment at that time is good. The threshold R is a threshold of the response rate α, and is set in advance and stored in the memory 16. The threshold R is a criterion for determination as to whether the radio wave environment is good, and is preferably determined based on a standard that a user requires for the calibration data. For example, preferably, when a strict management standard is set, the threshold R is set so that a response rate of less than 98% is determined as a bad radio wave, and when a comparatively moderate standard is set, the threshold R is set so that a response rate of less than 90% is determined as a bad radio wave. The calibration execution section 33 determines the radio wave is to be a good radio wave when response rate α≥threshold R, and determines the radio wave is to be a bad radio wave when response rate α<threshold R. When the radio wave is not good (No), the process shifts to Step S209, and when the radio wave is good (Yes), the process shifts to Step S203.

When the process shifts to Step S203, the calibration execution section 33 displays, for example, "Good" on the display unit 18 of the balance 10 to notify that the radio wave environment is good.

Next, the process shifts to Step S204, and the calibration execution section 33 determines that there is no problem in the radio wave environment and executes calibration. That is, the calibration execution section outputs a drive signal to the motor drive circuit 24 to operate the adding and removing unit 21 so as to load or unload the build-in weight 20, and outputs an acquired measurement value (calibration data) together with time information to the first radio communication device 41.

Next, the process shifts to Step S205, and the calibration execution section 33 issues a command to the first radio communication device 41 to transfer the calibration data. The first radio communication device 41 transmits the calibration data to the second radio communication device 42.

Next, the process shifts to Step S206, and the calibration execution section 33 checks if a positive acknowledgement is returned from the second radio communication device 42. When a positive acknowledgement is not returned (No), the process shifts to Step S208, and an error display (2) to notify that the calibration data has not been transferred, for example, "Not yet" is displayed on the display unit 18. When a positive acknowledgement is returned (Yes), the process shifts to Step S207, and it is determined that the calibration data has been safely transferred, and the buzzer 25 is sounded to notify this, and the operation is ended. A notification means other than the buzzer 25, for example, notification by display may be adopted, and in this case, the buzzer 25 may be an arbitrary component of the balance 10.

On the other hand, when the radio wave is determined to be bad in Step S202 and the process shifts to Step S209, the calibration execution section 33 displays, for example, "Bad" on the display unit 18 to notify that the radio wave environment is bad.

Next, the process shifts to Step S210, and the calibration execution section 33 again operates the radio wave environment check section 32 to determine whether the bad radio wave continues. When the bad radio wave does not continue (No), the process returns to Step S202. When the bad radio wave continues (Yes), the process shifts to Step S211, and the calibration execution section 33 displays an error display (1) to show that a radio wave environment for calibration data transfer has not yet been prepared, for example, "Bad radio" on the display unit 18, and ends the operation.

As described above, according to the balance 10 and the radio communication system 40 of the present embodiment, a "radio wave environment check" is performed prior to execution of calibration, so that only when the radio wave environment is good, calibration is executed and calibration data is transmitted.

By the balance 10 and the radio communication system 40, in a case where the radio wave environment is bad, the "radio wave environment check" is repeated, and calibration and data transmission are suspended until the environment is prepared, and as soon as the environment is prepared, calibration is executed and calibration data is transmitted. Therefore, radio communication of calibration data can be reliably executed.

Preferably, by determining whether the radio wave environment is good based on the response rate α in response to a command signal set according to a standard that a user requires, calibration data suitable for a use request from the user can be secured.

Second Embodiment

Figure 5:
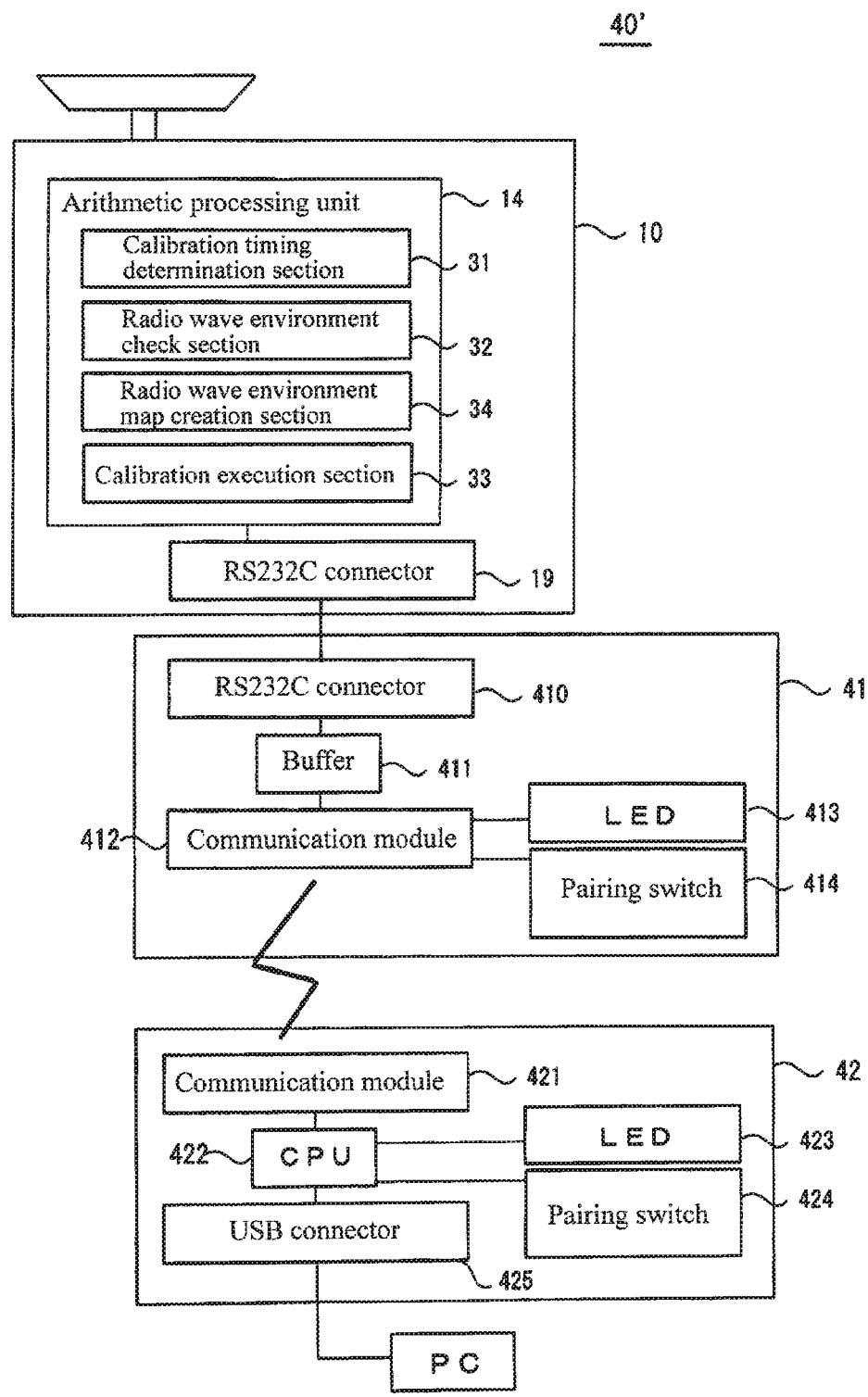
FIG. 5 is a block diagram of a radio communication system according to a second embodiment.

FIG. 5 is a block diagram of a radio communication system 40' according to a second embodiment. The same components as in the first embodiment are designated by the same reference signs, and description thereof is omitted.

The configuration of the balance 10 according to the second embodiment is the same as in FIG. 1 except that there is a change in elements of the arithmetic processing unit 14 as illustrated in FIG. 5. The arithmetic processing unit 14 includes the calibration timing determination section 31, the radio wave environment check section 32, and the calibration execution section 33, and further includes a radio wave environment map creation section 34.

In the present embodiment, the radio wave environment check section 32 periodically automatically operates (in predetermined periods, for example, every one hour), and a response rate α is recorded together with time information in the memory 16.

Figure 6:
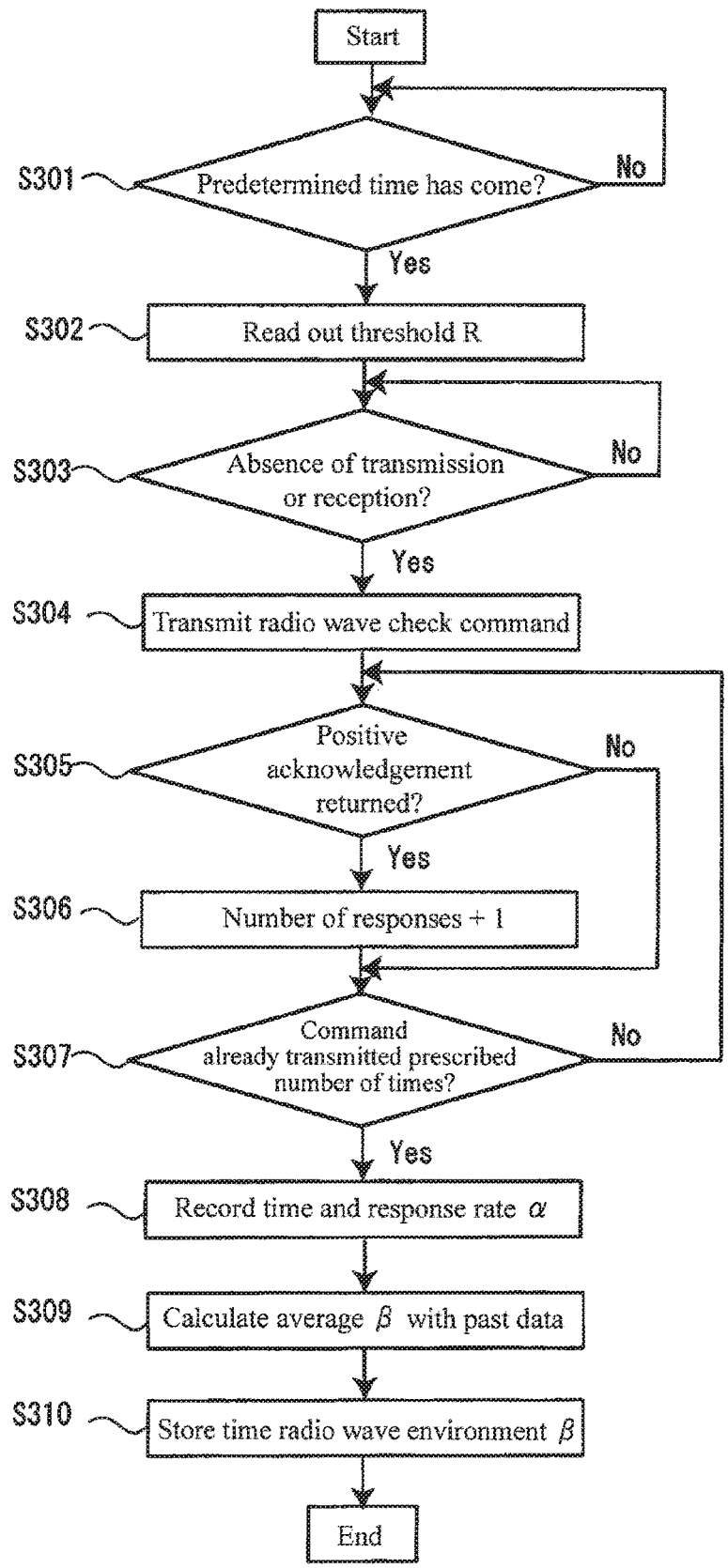
FIG. 6 is an operation flowchart of radio wave environment map creation according to the second embodiment.

The radio wave environment map creation section 34 creates a "radio wave environment map" by time based on a "radio wave environment check" performed by the radio wave environment check section 32. FIG. 6 is an operation flowchart of radio wave environment map creation.

First, in Step S301, the radio wave environment map creation section 34 acquires a system time from the system timer 15, and determines whether a predetermined time has been reached. When it is not the predetermined time (No), the process returns to Step S301, and when it is the predetermined time (Yes), the process shifts to Step S302.

When the process shifts to Step S302, the radio wave environment map creation section 34 operates the radio wave environment check section 32 so as to execute the operation of Steps S302 to S308. The operation of Steps S302 to S308 is operation of the "radio wave environment check," and is the same as the operation of Steps S101 to S107 in FIG. 3 according to the first embodiment.

Next, the process shifts to Step S309, and the radio wave environment creation section 34 refers to the memory 16 to check if there are past data on a response rate α corresponding to the current time (here, "corresponding to" may cover, for example, ±5 minutes from the current time). When there are past data on the response rate α, an average β of the response rate α is calculated by using the past data. When there are no past data, a response rate α at the current time is set as an average β.

Next, the process shifts to Step S310, and the radio wave environment map creation section 34 records the average β as "time radio wave environment" on the memory 16. Then, the radio wave environment map creation section 34 determines the radio wave to be good when time radio wave environment β≥threshold R, and determines the radio wave to be bad when time radio wave environment β<threshold R, and stores the radio wave environment at the current time and ends the operation.

Figure 7:
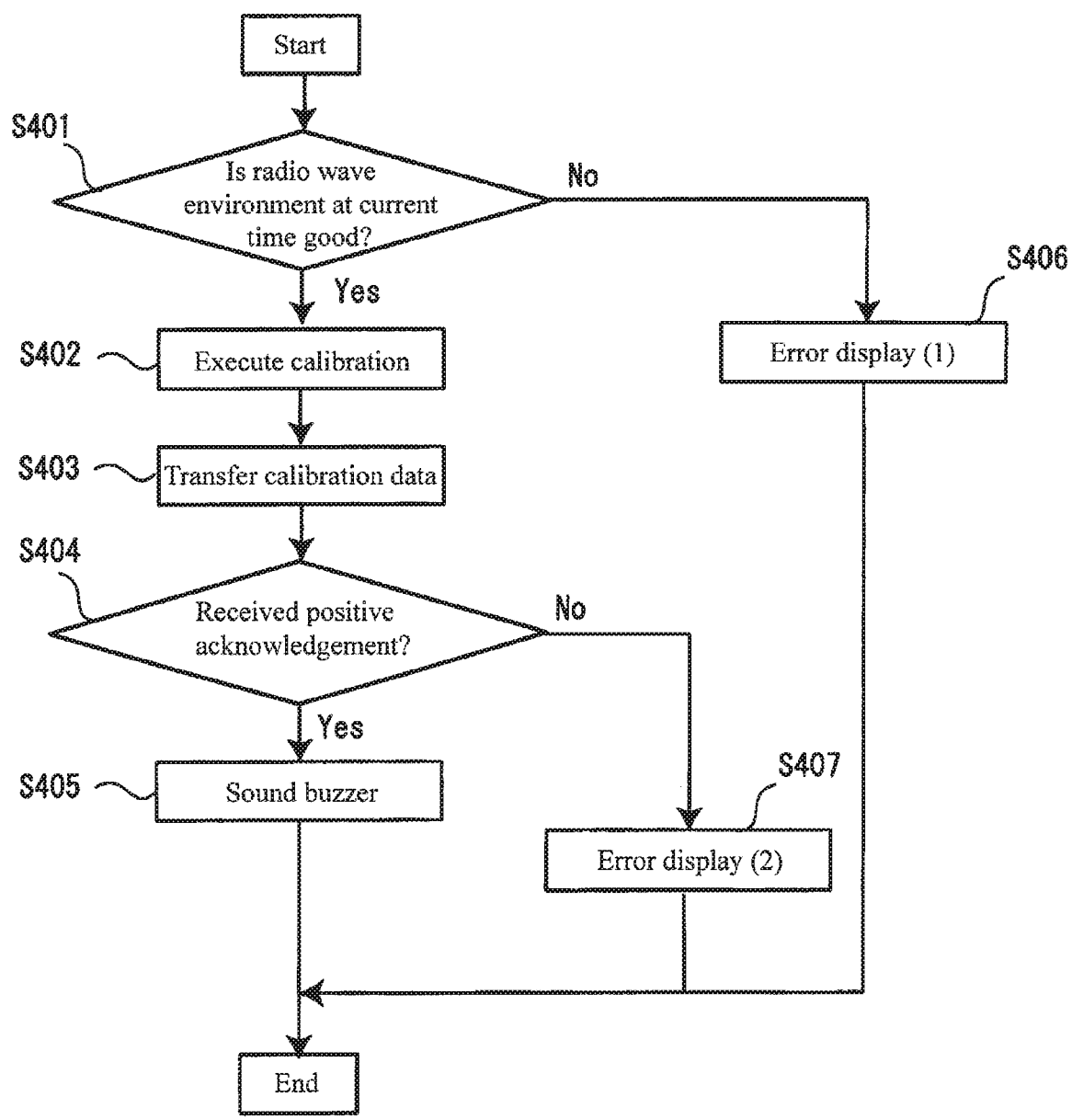
FIG. 7 is an operation flowchart of calibration according to the second embodiment.

FIG. 7 is an operation flowchart of calibration according to the second embodiment. The calibration execution section 33 of the present embodiment operates when the calibration timing determination section 31 determines it as a calibration timing (that is, when the calibration key is pressed down, or when automatic calibration starts).

First, in Step S401, the calibration execution section 33 determines whether the radio wave environment at the current time is good with reference to the "radio wave environment map" created by the radio wave environment map creation section 34. On the "radio wave environment map," when the radio wave at the current time is not good (No), the process shifts to Step S406, and when the radio wave is good (Yes), the process shifts to Step S402.

When the process shifts to Step S402, the calibration execution section 33 determines that the radio wave environment is likely to have no problem at the current time, and executes calibration. That is, the calibration execution section outputs a drive signal to the motor drive circuit 24 to operate the adding and removing unit 21 so as to load and unload the built-in weight 20, and outputs an obtained measurement value (calibration data) together with time information to the first radio communication device 41.

Next, the process shifts to Step S403, and the calibration execution section 33 issues a command to the first radio communication device 41 to transfer calibration data. The first radio communication device 41 transmits calibration data to the second radio communication device 42.

Next, the process shifts to Step S404, and the calibration execution section 33 checks if a positive acknowledgement is returned from the second radio communication device 42. When a positive acknowledgement is not returned (No), the process shifts to Step S407, and an error display (2) to notify that calibration data has not been transferred, that is, "Not yet" is displayed on the display unit 18. When a positive acknowledgement is returned (Yes), the process shifts to Step S405, and it is determined that the calibration data has been safely transferred, and the buzzer 25 is sounded and the operation is ended.

On the other hand, when the radio wave is determined to be bad in Step S401 and the process shifts to Step S406, the calibration execution section 33 displays an error display (1) to show that it likely that the radio wave environment has a problem at the current time, and a radio wave environment for calibration data transfer has not been prepared, for example, "Bad radio," and ends the operation.

As described above, according to the balance 10 and the radio communication system 40' of the present embodiment, prior to the execution of calibration, a "radio wave environment map" based on time periods is referred to, so that calibration is executed only when it is in a time period in which the radio wave environment is good and calibration data is transmitted. For the "radio wave environment map," data are automatically and continuously collected by and accumulated in the balance 10, so that the map uniquely adapts to the environment in which the balance 10 is located. Therefore, radio communication of calibration data can be reliably executed.

In the two embodiments described above, the first radio communication device 41 is described as an external device connected to the arithmetic processing unit 14 via the RS232C connector (communications connector) 19, however, the first radio communication device may consist of a communication IC (first radio communications unit) incorporated in the balance 10. Similarly, the second radio communication device 42 is described as an external device connected to the personal computer PC via the USB connector 425 (communications connector), however, the second radio communication device may consist of a communication IC (second radio communications unit) incorporated in the personal computer PC.

While preferred embodiments and modifications of the present invention and modifications are described above, the respective embodiments and the respective modifications can be combined based on knowledge of a person skilled in the art, and such combination modes are included in the scope of the present invention.

REFERENCE SIGNS LIST

10 Balance
12 Weight sensor
14 Arithmetic processing unit
19 RS232C connector
20 Built-in weight
21 Adding and removing unit
32 Radio wave environment check section
33 Calibration execution section
34 Radio wave environment map creation section
40, 40' Radio communication system
41 First radio communication device
42 Second radio communication device

What is claimed is:

1. An electronic beam balance comprising:
an electronic weight sensor that generates a signal indicative of weight;
a built-in weight to be loaded on the weight sensor;
an adding and removing unit for the built-in weight;
an arithmetic processing unit configured to drive the adding and removing unit;
a radio communication device connected to the arithmetic processing unit,
wherein the arithmetic processing unit includes
a calibration timing determination section that generates a calibration initiation signal after a predetermined time has elapsed or when a temperature detected by a temperature sensor exceeds a predetermined reference value or when a calibration key is pressed down;
a radio wave environment check section configured to check a radio wave environment surrounding the radio communication device, and
a calibration execution section in communication with the calibration timing determination section, the radio wave environment check section, and the adding and removing unit that, upon receipt of the calibration initiation signal, actuates the adding and removing unit to add or remove the built-in weight and issues a command to the radio communication device to execute calibration and transfer calibration data only when the radio wave environment check section determines that a response rate $\alpha$ to a periodic command signal is equal to or greater than a threshold R, and does not execute calibration when the radio wave environment check section determines that a response rate $\alpha$ to a periodic command signal is less than the threshold R.

2. The electronic beam balance according to claim 1, wherein the arithmetic processing unit further includes a radio wave environment map creation section configured to create a radio wave environment map by time by periodically checking the radio wave environment.

3. The balance according to claim 1, wherein the calibration execution section determines that the radio wave is bad when a response rate $\alpha$ to a periodic command signal is less than 90%.

4. A radio communication system comprising:
an electronic beam balance including an electronic weight sensor that generates a signal indicative of weight, a built-in weight to be loaded on the weight sensor, an adding and removing unit for the built-in weight, and an arithmetic processing unit configured to drive the adding and removing unit;
a first radio communication device connected to the arithmetic processing unit; and
a second radio communication device configured to receive data from the first radio communication device and installed in or connected to an external device,
wherein the arithmetic processing unit includes
a calibration timing determination section that generates a calibration initiation signal after a predetermined time has elapsed or when a temperature detected by a temperature sensor exceeds a predetermined reference value;
a radio wave environment check section configured to check a radio wave environment surrounding the first radio communication device, and
a calibration execution section in communication with the calibration timing determination section, the radio wave environment check section, and the adding and removing unit that, upon receipt of the calibration initiation signal, actuates the adding and removing unit to add or remove the built-in weight and issues a command to the first radio communication device to execute calibration and transfer calibration data to the second radio communication device only when the radio wave environment check section determines that a response rate $\alpha$ to a periodic command signal is equal to or greater than a threshold R, and does not execute calibration when the radio wave environment check section determines that a response rate $\alpha$ to a periodic command signal is less than the threshold R.

5. The radio communication system according to claim 4, wherein the arithmetic processing unit further includes a radio wave environment map creation section configured to create a radio wave environment map by time by periodically checking the radio wave environment.

6. The radio communication system according to claim 4, wherein the calibration execution section determines that the radio wave is bad when a response rate $\alpha$ to a periodic command signal is less than 90%.

* * * * *